Sept. 14, 1926.  1,599,778
T. J. LOFTUS
METERING PUMP FOR FLUIDS
Filed Oct. 1, 1923   2 Sheets-Sheet 1
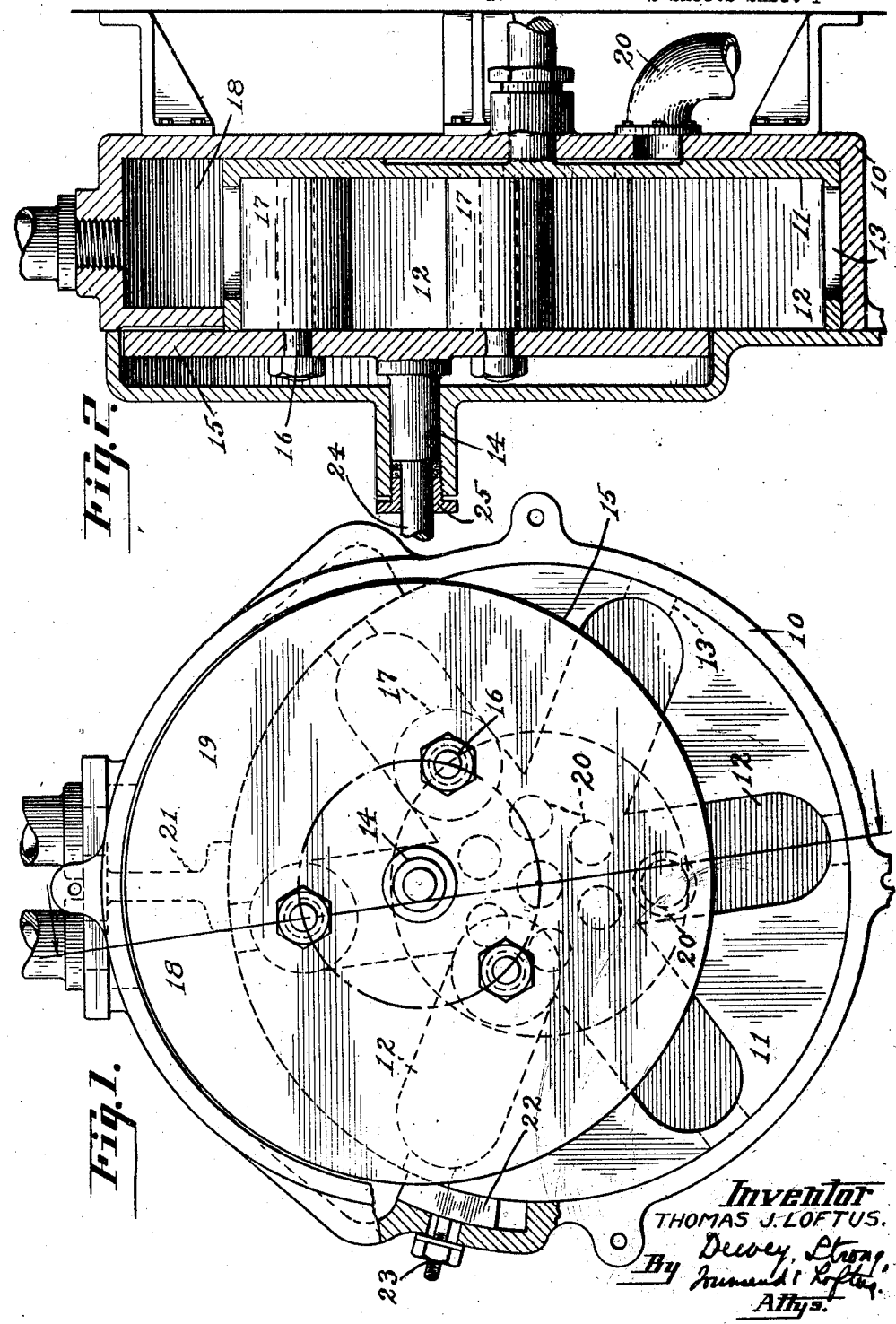
Inventor
THOMAS J. LOFTUS.

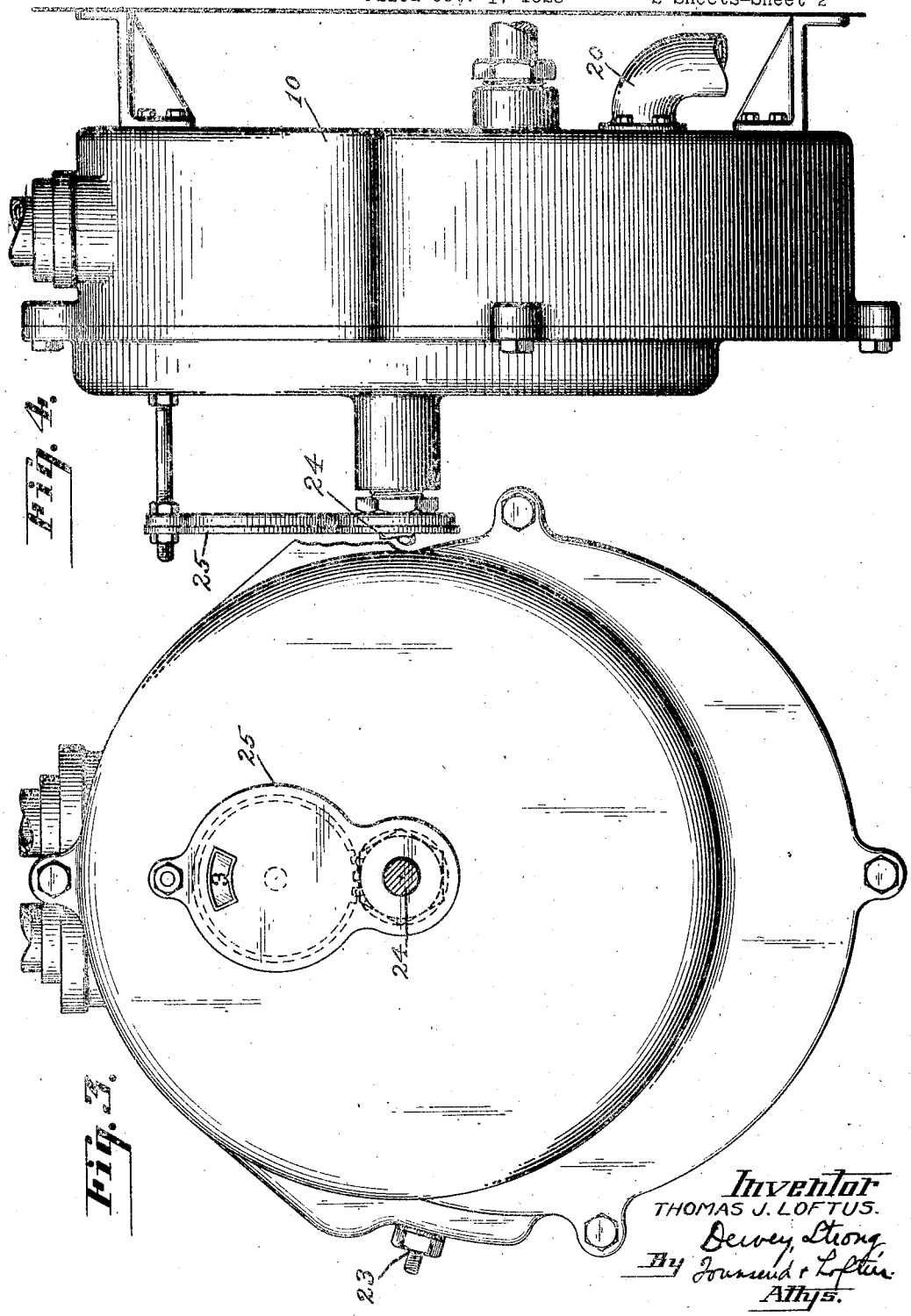

Patented Sept. 14, 1926.

1,599,778

UNITED STATES PATENT OFFICE.

THOMAS J. LOFTUS, OF CASTELLA, CALIFORNIA, ASSIGNOR OF ONE-HALF TO HARMON BELL, OF OAKLAND, CALIFORNIA.

METERING PUMP FOR FLUIDS.

Application filed October 1, 1923. Serial No. 665,874.

This invention relates to devices for pumping and measuring fluids.

The object of the invention is to provide a simple and inexpensive device which can be used either as a pump or as a meter or as both, and which will act not only to pump liquid with maximum efficiency, but will also accurately measure the amount of liquid pumped or passed through the device, and at the same time will not involve the complicated mechanical features of prior meters or pumps, and will not be subject to defective or inaccurate operation.

In general the device comprises a cylindrical casing, a rotor having radial slots, and an eccentrically mounted gear fitted with rollers working in said slots.

One form which my invention may assume is exemplified in the following description and illustrated in the accompanying drawings, in which—

Fig. 1 shows a circumferential sectional view of a meter or pump embodying my invention;

Fig. 2 shows a central sectional view taken at right angles to the view of Fig. 1;

Fig. 3 shows a top elevation of the device, with the cover in place;

Fig. 4 shows an edge view of the same.

Referring in detail to the accompanying drawings, I show a cylindrical casing 10 in which is fitted a rotor 11. This rotor has an even number of radial slots 12 open at one side and extending out from the center and terminating near the rim, at which point a small opening or port 13 is formed. Carried on a shaft 14 journaled in one head of the casing is a gear consisting of a disk 15 provided with roller-teeth working within the slots in the rotor. These teeth include a pin or stud 16 secured to the disk 15 and carrying a roller 17, of a size to fit closely within the slots in the rotor. There are one half as many roller-teeth as there are slots, and these teeth are so positioned with relation to the center of the gear that the centers of the teeth will pass through the center of the rotor as indicated by the dotted circle in Fig. 1.

One wall of the casing 10 on the side adjacent the axis of the eccentrically mounted gear is formed into two valve chambers 18 and 19, one constituting an inlet chamber for fluid and the other constituting an outlet chamber.

The position of these chambers is such that as any one port in the rotor becomes exposed to the inlet chamber 18 the roller-tooth therein is commencing to retract, and as the said port nears the end of the inlet chamber 18 the roller-tooth has reached the narrow end of its slot. In this way a quantity of fluid sufficient to fill the slot will be withdrawn from the inlet chamber and carried to the interior of the pump or meter. Thus a definite and measured quantity of fluid is drawn into the pump as each port in connection with a slot sweeps past the inlet chamber. While I show the outlet chamber in Fig. 1 as disposed symmetrically with the inlet chamber, it will be apparent that said outlet chamber may be dispensed with, and the fluid discharged through a pipe such as is shown at 20, which connects with the interior of the rotor at the center of the latter. Where the outlet chamber as indicated at 19 is provided its position is such that as any port in the rotor enters this chamber a roller-tooth in that particular slot will just be entering the corresponding slot and will reach the end of said slot when the port is covered by the division wall or plate 21 which separates the inlet and outlet chambers.

When it is desired to use this device as a meter pump the exact capacity of any one slot is first determined, and when multiplied by the number of slots in the rotor will give the exact quantity of fluid passing through the pump for each revolution of the rotor, or optionally the number of revolutions of the eccentric gear can be used for measuring the quantity of liquid passing through the pump, in which case the quantity will be one-half as much for each revolution of the gear as for each revolution of the rotor, since the gear makes two revolutions to each single revolution of the rotor. In Fig. 3 I show a conventional form of meter 25 connected with the shaft 14.

With a view to obtaining greater accuracy of adjustment in so far as the measurement of liquid is concerned, I provide an adjustable plate 22 at the end of the inlet chamber. This plate is held adjustably in place by a bolt 23, or otherwise, and can be shifted circumferentially so as to bring about an advanced or retarded closure of the ports, thus making it possible to regulate to a nicety the charge of liquid drawn into the slot.

Where the device is used simply as a meter and the liquid to be measured is being forced through the device either by gravity or pressure, the pressure of the liquid acting upon a roller-tooth at the time the port becomes uncovered will be sufficient to cause operation of the rotor and gear, owing to lack of friction of the device and the principle of operation involved.

Where it is desired to apply outside power to the device for use in operating it both as a pump and a meter, I extend the shaft or axle of the eccentric gear out through the casing as indicated at 24, and provide the same with a crank or other operating means not shown. In this connection I show a combined thrust-bearing and packing-sleeve 25 surrounding the shaft 24 and exerting a thrust inwardly, so that the disk 15 will be kept in close contact with the side of the rotor, thus preventing leakage.

The device may be operated either in vertical or horizontal position. Due to its construction and arrangement it is remarkably free of friction, and little if any wear occurs in the moving parts.

Various changes in the construction and arrangement of the several parts herein shown and described may be employed, without departing from the spirit of my invention as shown in the appended claims.

Having thus described my invention, what I claim and desire to secure by Letters Patent is:

A device for measuring or pumping fluid, comprising a cylindrical casing, a rotor therein having radially disposed slots open at one side and communicating with each other at their inner ends and having ports leading through the rim of the rotor, a gear mounted eccentrically within the casing and having a disk closing the open side of the slots and carrying roller teeth to work within the slots, the teeth being so positioned that their centers pass through the center of the rotor, means to open the port in each slot to admit fluid thereto when a tooth is commencing to retract, adjustable means to close the port when the tooth is fully retracted, and means to discharge the fluid from the device.

THOMAS J. LOFTUS.